United States Patent
Bortolozzo et al.

(10) Patent No.: US 10,370,062 B2
(45) Date of Patent: Aug. 6, 2019

(54) BICYCLE ELECTRONIC SYSTEM

(71) Applicant: Campagnolo S.r.l., Vicenza (IT)

(72) Inventors: Gianluca Bortolozzo, Venice (IT); Flavio Cracco, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 285 days.

(21) Appl. No.: 15/212,711

(22) Filed: Jul. 18, 2016

(65) Prior Publication Data
US 2017/0021897 A1 Jan. 26, 2017

(30) Foreign Application Priority Data
Jul. 20, 2015 (IT) .......................... UB2015A002302

(51) Int. Cl.
*B62M 25/08* (2006.01)
*B62J 99/00* (2009.01)
(Continued)

(52) U.S. Cl.
CPC ............ *B62M 25/08* (2013.01); *B60W 40/08* (2013.01); *B62J 99/00* (2013.01); *G06F 8/65* (2013.01);
(Continued)

(58) Field of Classification Search
CPC .......... B62M 25/08; B60W 40/08; G06F 8/65
See application file for complete search history.

(56) References Cited

U.S. PATENT DOCUMENTS

| 6,682,087 B1 | 1/2004 | Takeda |
| 2005/0246152 A1 | 11/2005 | Kokatsu et al. |

(Continued)

FOREIGN PATENT DOCUMENTS

| EP | 2808239 A1 | 12/2014 |
| EP | 2808240 A1 | 12/2014 |
| WO | 2014205345 A2 | 12/2014 |

OTHER PUBLICATIONS

Italian Search Report and Written Opinion in Italian Application No. UB2015A002302, dated Apr. 22, 2016, with English translation.
(Continued)

*Primary Examiner* — Edwin A Young
(74) *Attorney, Agent, or Firm* — Volpe and Koenig, P.C.

(57) ABSTRACT

A bicycle management APP dedicated to an APP-compatible device configured to communicate with an APP interface module of a bicycle electronic system. The bicycle management APP comprises software code configured to carry out at least one of (a) updating a firmware stored and executed by a controller of the bicycle electronic system, and/or (b) setting a value for one or more parameters of the firmware stored and executed by the controller of the bicycle electronic system. And, a bicycle electronic system comprising an APP interface module; a user assembly comprising an APP-compatible device with the APP and at least one bicycle electronic system comprising said APP interface module; and an information system for managing bicycles comprising at least one user assembly and a server, the APP-compatible device of said at least one user assembly being configured to communicate with the server over a telecommunication network, in particular Internet.

15 Claims, 4 Drawing Sheets

(51) Int. Cl.
  *B60W 40/08* (2012.01)
  *G06F 8/65* (2018.01)
  *G07C 5/00* (2006.01)

(52) U.S. Cl.
  CPC ..... *G07C 5/008* (2013.01); *B60W 2040/0872* (2013.01); *B62J 2099/0013* (2013.01)

(56) References Cited

U.S. PATENT DOCUMENTS

| | | |
|---|---|---|
| 2008/0109121 A1 | 5/2008 | Takeda |
| 2010/0198453 A1 | 8/2010 | Dorogusker |
| 2010/0228405 A1 | 9/2010 | Morgal |
| 2013/0027052 A1 | 1/2013 | Matsumoto |
| 2013/0030603 A1* | 1/2013 | Hashimoto ............ B62M 25/08 701/1 |
| 2014/0209400 A1 | 7/2014 | Yao |
| 2015/0180517 A1 | 6/2015 | Abe |

OTHER PUBLICATIONS

Bryton: "Rider 60 User Manual—Bryton", Dec. 31, 2013 (Dec. 31, 2013), XP002756930. Retrieved from the Internet: URL:http://static.brytonsport.com/uploads/corp/Manual/25/UnitedStates/Kind_25_UnitedStates_20131203131001.pdf—[retrieved on Apr. 22, 2016] * p. 48 *.

Office Action for European Application No. 16179389.8, dated May 30, 2018.

* cited by examiner

BICYCLE ELECTRONIC SYSTEM

CROSS REFERENCE TO RELATED APPLICATION

This application claims the benefit of Italian Application No. UB2015A002302, filed on Jul. 20, 2015 and incorporated herein by reference as if fully set forth.

FIELD OF INVENTION

The present invention relates to a bicycle electronic system and in particular a bicycle electronic gearshift.

More specifically, the invention relates to an assembly of such a system and an APP-compatible device, as well as to an information system and a bicycle management APP.

BACKGROUND

In the present description and in the attached claims, "APP-compatible device" is meant to indicate a personal portable electronic device configured to support the operation through APPs. Such APP-compatible devices are typically configured for access to Internet. Such APP-compatible devices typically lack a physical keyboard, being of the touch screen type or using an electronic pen. In particular, the portable electronic device is intended to be used by the cyclist.

An APP-compatible device can be for example:

a "smartphone" (in Italian "telefono intelligente" "cellulare intelligente", "telefonino multimediale"), a term meant to indicate a cell phone provided with advanced computation, storage and data connection capabilities, provided with an operating system for mobile devices, like for example iOS, Windows Phone, Blackberry, Android, Embedded Linux and many others;

a "tablet", a term meant to indicate a compact-sized computer, which uses, as the only one input system, a screen controlled by a pen or fingers instead of a keyboard and a mouse, a "phablet", a term meant to indicate a device larger than a smartphone, but smaller than a tablet.

In the present description and in the attached claims, "APP" is meant to indicate a computer application dedicated to mobile devices, such as in particular those listed above.

Such an APP can be a "native APP" ("mobile APP") or a "web APP".

In the present description and in the attached claims, "native APP" is meant to indicate an APP programmed for a specific operating system, and that is physically installed and is used entirely on the mobile device.

In the present description and in the attached claims, "web APP" is meant to indicate a link towards a remote computer application written in a multi-platform language and executed through Internet access, wherein possibly just the code of the user interface is installed on the mobile device. In particular, a web APP can be an application operating within an Internet browser on the APP-compatible device.

An APP according to the invention can also be installed and executed locally ("native APP"), although requiring access to a server through Internet, at least for user authentication and for the authorization to execute the APP itself, for safety reasons.

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur are provided for. In the case of an electronically servo-assisted gearshift, briefly called electronic gearshift herein, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any moving part downstream of the rotor, down to the chain guide element itself. It is worthwhile noting that slightly different terminology from that used in this context is also in use.

The toothed wheels associated with the hub of the rear wheel are also known as sprockets, while those associated with the axle of the pedal cranks of the bicycle are also known as crowns or gears.

Control electronics change the gear ratio automatically, for example based on one or more variables detected by suitable sensors, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons.

In gearshifts of a first type, a control device of the front derailleur and a control device of the rear derailleur—or only one of the two in the case of simpler gearshifts—are mounted so as to be easily manoeuvred by the cyclist, usually on the handlebars, close to their handgrips where the brake lever for controlling the brake of the front and rear wheel, respectively, is also located. Control devices that allow driving both a derailleur in the two directions and a brake are commonly known as integrated controls. By convention, the control device of the front derailleur and the brake lever of the front wheel are located close to the left handgrip, and the control device of the rear derailleur and the brake lever of the rear wheel are located close to the right handgrip.

In gearshifts of a second type, a control device, again mounted so as to be easily manoeuvred by the cyclist, allows a gearshifting request manual command to be input—which can be to decrease the ratio or to increase the ratio—and the electronic system controls the driving of the front derailleur and/or of the rear derailleur to actuate the requested gearshifting.

When both a front derailleur and a rear derailleur are provided, typically the increase in gear ratio can take place by moving the rear derailleur onto a toothed wheel with a smaller diameter/smaller number of teeth and/or by moving the front derailleur onto a toothed wheel with a larger diameter/larger number of teeth; the decrease in gear ratio can take place by moving the rear derailleur onto a toothed wheel with a larger diameter/larger number of teeth and/or by moving the front derailleur onto a toothed wheel with a smaller diameter/smaller number of teeth.

In the on-board electronic bicycle system, a power supply for the above components is typically further provided.

Moreover, a computer cycle may be provided, that may be associated, even just temporarily, to the remaining components.

The aforementioned components and possibly others are located on-board the bicycle and there are means for communication between them. In case of wireless communication, the electronic bicycle system may comprise one or more wireless to wired and/or wired to wireless transducer(s).

Published applications, US 2014/0358386 A1 and US 2014/0358387 A1 describe a control system comprising at least one bicycle electronic system mounted on-board a bicycle, and a supervisor device not mounted on-board bicycles, in wireless communication with each other. Preferably, the supervisor device is on-board a team car, which follows a bicycle or a team of bicycles during a race. The team manager is located on-board the team car. Through wireless communication, the current value of one or more parameters and/or variables of the on-board systems of one or more bicycles can advantageously be transmitted to the supervisor device and/or the value of one or more parameters and variables of the on-board systems of one or more bicycles can be changed by the supervisor device.

The Applicant observed that the wireless communication between two moving units is not sufficiently reliable, and that only the changes of the values of the parameters in any case has a limited impact on the operation of the on-board system. Moreover, the cyclist is not offered any possibility of personal intervention.

Document WO 2014/205345 A2 describes a bicycle having a bicycle electronic system having a processor integral to the bicycle and having, integrated in the frame, a holder for a smartphone provided with an APP. The smartphone, when docked in the holder, is linked to the processor in a manner not better specified, receives information therefrom such as information on maintenance, battery charge and the current gearing, and is integrated with the lights and with mechanical locks to authorize the use of the bicycle and with generators of vibrations on the handlebars to provide navigation information to the cyclist. The smartphone, when it is not docked in the holder, can communicate with the processor over a mobile communication network to obtain position data of the bicycle. A server can manage user credentials that associate the smartphone and the bicycle processor, provide an APP that can be downloaded into the smartphone, store information on maintenance, and send instructions for maintenance.

The Applicant observed that such a system is not sufficiently adaptable to pre-existing bicycles and bicycle electronic systems since it requires the smartphone holder integrated with the frame; moreover, the APP of such a document substantially only plays an informing role for the cyclist, without making lasting changes to the state of the gearshift and, although it interacts with the remaining components of the bicycle such as lights, mechanical locks, etc., it does so through the emission of commands in real time, without making changes to the firmware and to the content of the memory of the processor.

SUMMARY

The technical problem at the basis of the invention is that of avoiding the aforementioned drawbacks.

According to the invention, this problem is solved by allowing an APP-compatible device to be able to interact with an on-board controller of the electronic system of the bicycle in such a way as to influence the subsequent operation thereof irrespective of whether the smartphone is present, in particular providing that the APP-compatible device changes the instructions and/or the values of the operating parameters of the controller of the bicycle electronic system, instructions and parameters that are stored in the bicycle electronic system. In this way, in particular the cyclist can customize the bicycle electronic system based on his/her own needs and preferences, even every day or more often.

In the present description and in the attached claims, under "instruction" a command imparted to the controller using a language that can be understood thereby is meant.

In the present description and in the attached claims, the expression "operating parameter" is meant to indicate an amount that can take up a plurality of values, among those of a homogeneous and consistent set.

In an aspect, the invention relates to a computer program in the form of a bicycle management APP dedicated to an APP-compatible device, said APP-compatible device being configured to communicate with an APP interface module (or module interfacing with APP) of a bicycle electronic system, said bicycle management APP comprising software code configured to carry out at least one of:

a) updating a firmware stored and executed by a controller of the bicycle electronic system, and/or b) setting a value for one or more parameters of the firmware stored and executed by the controller of the bicycle electronic system.

The APP-compatible device is preferably intended to travel on the bicycle provided with the bicycle electronic system.

Preferably, the APP-compatible device is selected from the group consisting of a smartphone, a tablet and a phablet.

Preferably said software code configured to carry out the updating a) is configured to carry out at least one of:

a1) updating a firmware stored and executed by a processing unit of an interface unit of the bicycle electronic system, said interface unit being configured to receive manual command input by electromechanical manual control devices, and possibly process them, and/or a2) updating a firmware stored and executed by a processing unit of a power unit of the bicycle electronic system, said power unit being configured to manage at least one derailleur of the bicycle electronic system, and/or a3) updating a firmware stored and executed by a processing unit of the APP interface module.

Preferably said software code configured to carry out the setting b) is configured to carry out at least one from:

b1) setting a value for one or more parameters of a firmware stored and executed by a processing unit of an interface unit of the bicycle electronic system, said interface unit being configured to receive manual commands input by electromechanical manual control devices, and possibly process them, and/or b2) setting a value for one or more parameters of a firmware stored and executed by a processing unit of a power unit of the bicycle electronic system, said power unit being configured to manage at least one derailleur of the bicycle electronic system, and/or b3) setting a value for one or more parameters of a firmware stored and executed by a processing unit of the APP interface module.

Preferably, said software code is configured to present the user with a guided procedure for interaction with the bicycle electronic system aimed at obtaining the value of said one or more parameters. In this way, the specific value of the parameter can even remain totally transparent to the user.

Alternatively or in addition, said software code is configured to obtain the value of said one or more parameters and/or the current value of one or more variables from a remote server, a software code external to said APP being provided for, configured to set the value of said one or more parameters and/or of said one or more variables on the remote server.

In the present description and in the attached claims, the expression "variable" again is meant to indicate an amount that can take up a plurality of values, among those of a homogeneous and consistent set, but the value of which varies in a continuative manner during the execution of the software code. In opposition thereto, the value of a parameter, in the way such an expression is meant in the present description and in the attached claims, is acquired at the start of executing the software code or a portion thereof.

In this way, it is possible to obtain a sort of remote control of the bicycle electronic system, for example following the remote evaluation of the travel conditions by a team manager. Such travel conditions can include the conditions of the terrain and/or the conditions of the bicycle electronic system and/or the physical conditions of the cyclist. Since a server is used as an intermediary, a reliable connection, in particular an Internet connection, can also be exploited to allow control by a team manager or others traveling together with the cyclist on their own means of transportation.

Preferably said APP further comprises software code configured to carry out at least one of:

c) storing a physical configuration of the bicycle electronic system;

d) displaying indications on a state of the bicycle electronic system to a user;

e) diagnostics of components of the bicycle electronic system;

f) communicating to/from a server the outcome of diagnostic procedures/the diagnosis;

g) storing and/or displaying and/or communicating to a server (64) travel data;

h) inputting a command to change a gear ratio of the bicycle electronic system;

i) suggesting a user to change a gear ratio of the bicycle electronic system;

j) anti-theft/shoplifting function; and/or any combination of functionalities a)-i) listed above.

Preferably, said software code configured to carry out h) inputting a command and/or i) suggesting a user to change gear ratio is configured to receive a corresponding input from a remote server.

Especially when in combination with g) communicating to a server travel data, it is possible—in a similar manner to what is described above—to remotely control the bicycle electronic system, for example following the evaluation of the travel conditions by a team manager, who in turn accesses the server.

Preferably the aforementioned APP further comprises software code configured to carry out the storage of a physical configuration of at least one bicycle without bicycle electronic system.

In an aspect, the invention relates to a bicycle electronic system comprising an APP interface module configured to communicate with the aforementioned APP.

Preferably, the bicycle electronic system comprises a bicycle electronic gearshift.

Preferably, the APP interface module comprises a programmable processing unit, an interface for interfacing with the aforementioned APP and an interface for interfacing with a controller of the bicycle electronic system.

Preferably, said interface for interfacing with the APP is a transceiver radio.

Alternatively, said interface can for example be a wired interface such as a USB interface, or a wireless WIFI or infrared interface, etc.

More preferably, the transceiver radio of the APP interface module operates in the frequency band of 2.4 GHz.

Preferably, the communication takes place through a low power protocol.

Even more preferably, the APP interface module uses a communication protocol selected between Bluetooth Low Energy and ANT+.

The APP interface module advantageously comprises an antenna integrated in the printed circuit. Such an integrated antenna can for example be in the form of a coated copper track.

Alternatively, the APP interface module comprises a software module integrated within a controller of the bicycle electronic system, and an interface for interfacing with the aforementioned APP.

Such a software module can be a communication library.

In an aspect, the invention relates to a user assembly comprising an APP-compatible device on which the aforementioned APP is available, and at least one bicycle electronic system as stated above, comprising said APP interface module.

In an aspect, the invention relates to an information system for managing bicycles comprising at least one user assembly as stated above and a server, the APP-compatible device of said at least one user assembly being configured to communicate with the server over a telecommunication network, in particular Internet.

Preferably, the server comprises software code configured to receive access credentials and/or information on the bicycle electronic system from the APP, and to allow the APP to be executed and/or at least one firmware for storage in, and execution by, a controller of the bicycle electronic system and/or the APP interface module to be downloaded through the APP based on the access credentials and/or information on the bicycle electronic system received.

Preferably, the server comprises software code configured to integrate travel data relative to the bicycle electronic system with at least one software application distinct from the aforementioned bicycle management APP.

Preferably, the travel data is collected by sensors of the bicycle electronic system and is stored by the APP and transmitted to the server. The software application can for example comprise a geo-location, anti-theft/shoplifting, mapping, fitness monitoring, social network data sharing application, etc.

Preferably, the information system further comprises an electronic device distinct from the APP-compatible device of said at least one user assembly and configured to interact with said bicycle management APP through said server.

BRIEF DESCRIPTION OF THE DRAWING(S)

Further features and advantages of the present invention will become clearer from the following detailed description of some preferred embodiments thereof, made with reference to the attached drawings. The different features illustrated and described with reference to the individual configurations can be combined together as desired. In the following description, in order to illustrate the figures identical or similar reference numbers are used to indicate constructive or functional elements with the same function or an analogous function. In the drawings.

DETAILED DESCRIPTION OF THE PREFERRED EMBODIMENT(S)

Figure 1:
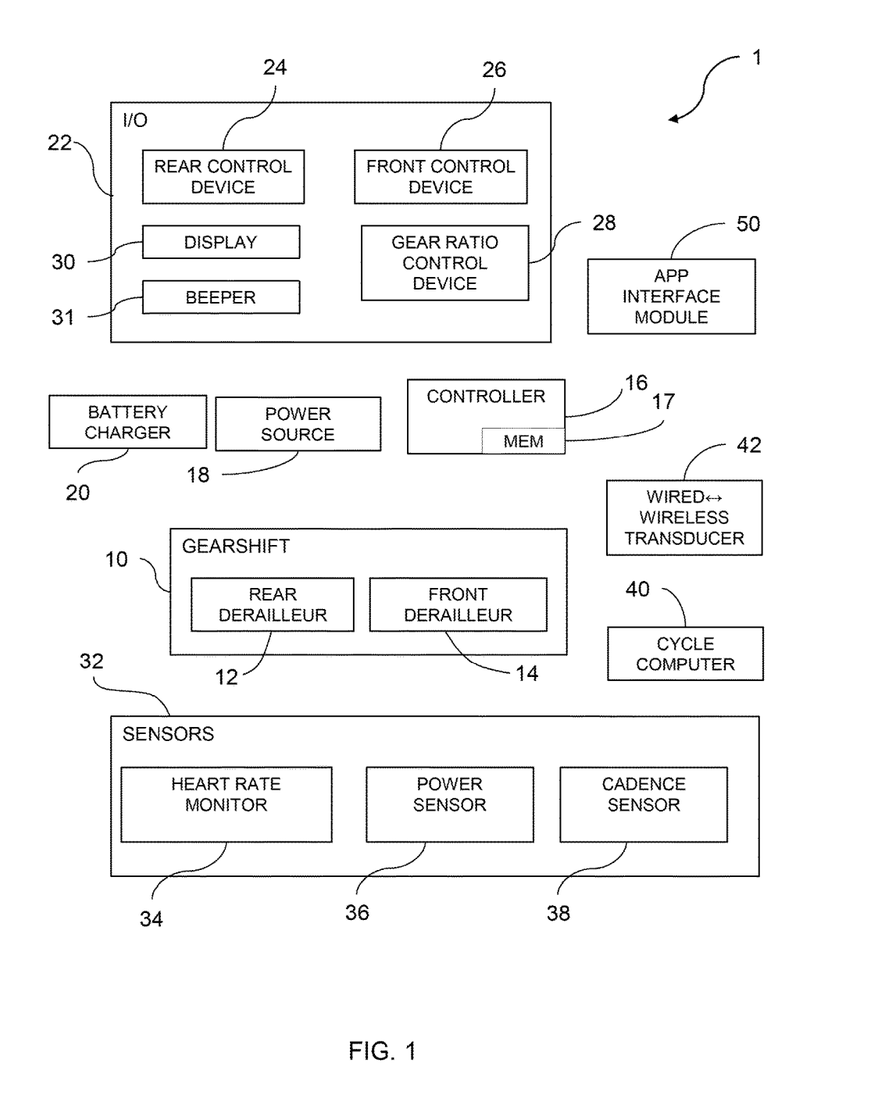
FIG. 1 is a block diagram of a bicycle electronic system according to an embodiment of the present invention.

With reference to FIG. 1, a bicycle electronic system 1 comprises one or more of the various mechanical, electromechanical and electronic components described hereinafter. It should be emphasized that not all of the components illustrated and described are necessarily present in the system 1, some being optional or provided as alternatives to each other, as will be apparent to those skilled in the art. The components are housed in one or more casings, each casing being more or less stably fixable to the bicycle and/or worn by the cyclist.

The system 1 comprises a gearshift 10. The gearshift 10 comprises a rear derailleur 12 and/or a front derailleur 14. For the description of these electromechanical components, which are per se known, reference is made to the introductory part.

The system 1 typically comprises a processing unit or controller 16. The controller 16 comprises at least one processor—typically a microprocessor or a microcontroller—suitable for processing data and manage the other components of the system 1, by providing for suitable procedures and/or hardware, software and/or firmware modules comprising the relevant instructions.

In the present description and in the attached claims, under the term controller 16 a logic unit shall be meant, which can however be formed from plural physical units, in particular from one or more distributed microprocessors that can be contained in one or more casings together with one or more of the other components of the system 1.

The controller 16 is provided with, or is in communication with, an internal memory 17 for the volatile and/or non-volatile storage of program instructions, parameters, variables and constants. In the present description and in the attached claims, under memory 17 a logic unit shall be meant, which can however be formed from plural physical units, in particular one or more flash, RAM, ROM, EPROM memories, etc., that can be contained in one or more casings together with one or more of the other components of the system 1.

The system 1 comprises a power source 18. The power source 18 typically comprises at least one rechargeable battery. Alternatively or in addition thereto, the power source 18 can comprise a dynamo that generates electrical energy in the form of direct current from the mechanical work of rotation of a wheel of the bicycle and/or of the pedals. In practice, there can be plural power sources located in the system 1, also of different types, for example a power source for moving the derailleur(s) and at least one power source suitable for the electronic components.

Preferably, the rechargeable battery is of the "smart" type, namely provided with a dedicated control processing unit, such as a microprocessor, with a memory of battery data such as optimal operating parameters, charging/discharging cycles, remaining charge, etc.

In the case in which the power source 18 comprises at least one rechargeable battery, the system 1 can comprise a battery charger 20, preferably of the "smart" type. The battery charger 20 is preferably removable from the rest of the bicycle electronic system 1, so that it may be left at a bicycle shelter building during travel.

The system 1 comprises a user interface 22. The user interface 22 typically comprises at least one electromechanical manual control device 24, 26, 28 as discussed in the introductory part, for generating input signals into the system 1 and in particular gearshifting requests, as well as an optional display device 30 with indicator lights like for example LEDs or with an alphanumeric display or with a graphical display—monochrome or colour—to provide visual information of the system 1 to the user. Both a rear or right manual control device 24, typically associated with the rear derailleur, and a front or left manual control device 26 typically associated with the front derailleur, and a manual control device 28 of the gear ratio are shown by way of an example, it being understood that the former two will typically be present as an alternative to the latter.

Preferably, the interface 22 also allows the selection of options and/or the selection/input of values, for example embodying a suitable graphical interface with the controls 24, 26, 28 and the display 30, or providing for a suitable keyboard or keypad.

Furthermore, in the interface 22 a sound emitting device, for example a beeper 31, can be provided for to provide feedback that can be heard by the cyclist.

The user interface 22 can be entirely absent—or it can comprise the output devices 30, 31 only—in the case in which only an automatic operating mode of the system 1 is provided for.

The system 1 can possibly comprise one or more of the following sensors 32 of run-time variable quantities, which generate respective measurement or detection signals:

a heart rate monitor 34, for detecting the heart rate of the cyclist, a power sensor 36 that measures the power delivered by the cyclist, namely the product of force applied to pedals, and cadence of rotation of the pedal cranks, a cadence sensor 38 that measures the cadence of rotation of the pedal cranks.

Other sensors may also be provided for in the system 1, including a clinometer, an anemometer, a speedometer, an accelerometer, a thermometer, a GPS, a vibration sensor, etc.

The bicycle electronic system 1 can also comprise a cycle computer 40 associable even only temporarily with the system 1. Alternatively, the controller 16, the display 30, and the beeper 31 where provided for, as well as possible buttons of the interface 22, can consist of the components of the cycle computer 40.

Besides being suitably connected to the mechanical parts of the bicycle, the components of the system 1 lacking an internal power source are suitably connected—directly or indirectly—to the power source 18.

Moreover, the components of the system 1 are suitably in communication with the controller 16 and/or with each other. The communication can be wireless, wired, or hybrid.

The wired communication preferably takes place with a serial protocol. The wired communication can take place with point to point connections or through a communication bus.

The wireless communication takes place for example according to one of the low energy consumption communication protocols ZigBee, ANT+ or BTLE (Blue Tooth Low Energy).

The system 1 can therefore comprise one or more wireless-to-wired and/or wired-to-wireless transducers 42.

In an automatic control mode, the controller 16 evaluates the current conditions (of the gearshift 10 and/or of the terrain and/or of the cyclist) and establishes the gear ratio to be set, and the manual control devices 24, 26, 28 are absent, are not network-connected, or the commands output by them are totally ignored by the controller 1.

In a manual control mode, the cyclist inputs the gearshifting requests that he/she deems appropriate through the electromechanical manual control device(s) 24, 26, 28, at the time he/she deems appropriate. The controller 16, having possibly carried out some checks—for example that the gearshift is not already at the maximum gear ratio when it receives a request to increase ratio—outputs a suitable signal for the gearshift 10. The sensors 32 are absent, are not network-connected, or the measurement values output by them are totally ignored by the controller 1.

In a semi-automatic control mode, the cyclist inputs the gearshifting requests that he/she deems appropriate through the electromechanical manual control device(s) 24, 26, 28, at the time he/she deems appropriate. Such device(s) 24, 26, 28 output(s) a gearshifting request signal and the controller 16 receives it. Independently thereof and in parallel therewith, the controller evaluates the current conditions, and establishes when it is suitable to send a control signal to gearshift 10. The controller 16 manages the request conflicts between the requests of the cyclist and the requests generated internally.

The controller 16 preferably implements a setting mode in which the values of various parameters/variables used by the instructions executed by the controller 16 are set by the user, preferably each within a predetermined range of values. Moreover, preferably for each parameter/variable a default value to be used in the absence of a setting defined by the user is stored in a read only area of the memory 17.

Figure 2:
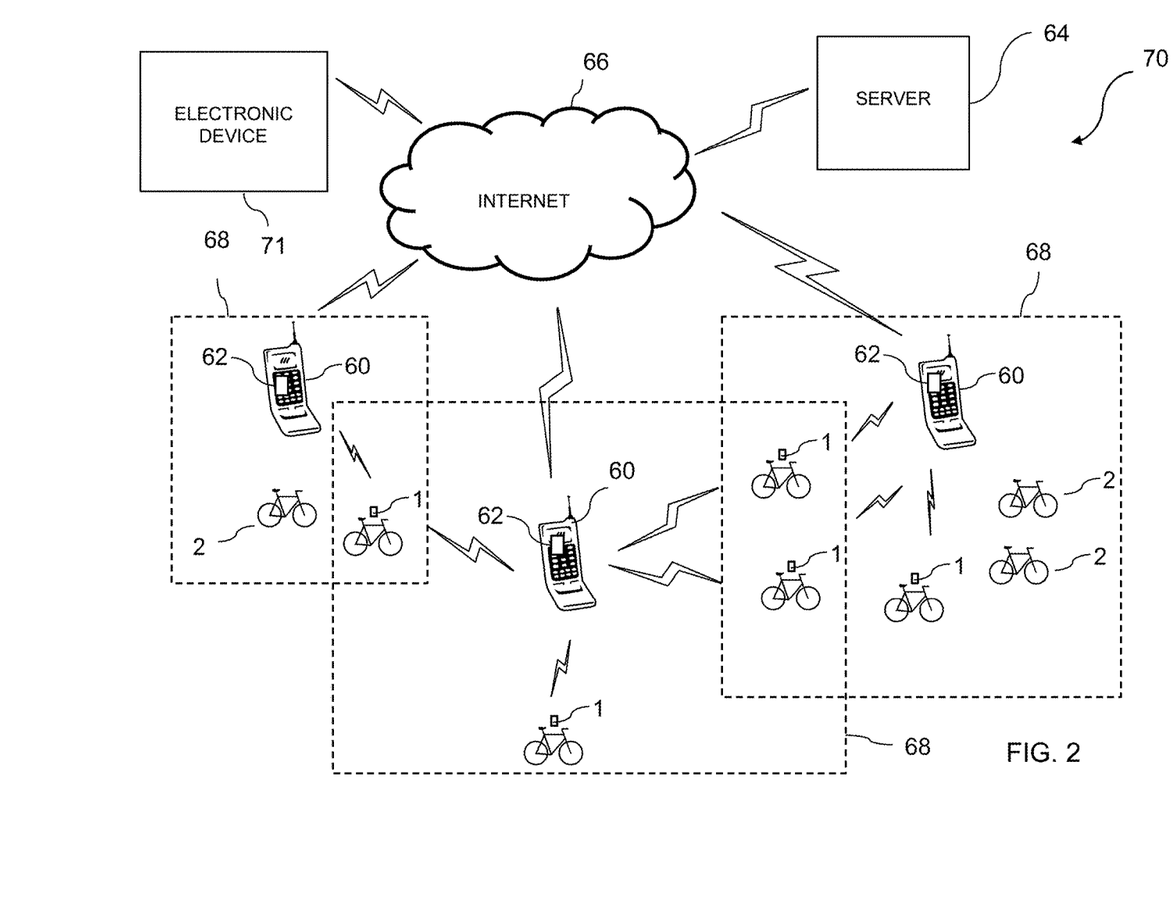
FIG. 2 is a schematic illustration of an information system for managing bicycles according to an embodiment of the present invention.

According to the invention and also with reference to FIG. 2, the bicycle electronic system 1 is provided with an APP interface module 50 (or module interfacing with APP). The APP interface module 50 interfaces with an APP 62 available on a smartphone or a tablet or a phablet or other APP-compatible device (FIG. 2) through a wireless communication, there being a matching communication module on the APP-compatible device 60. The APP interface module 50 is also in wired communication with the controller 16 of the system 1, and in particular with its memory area 17.

The APP interface module 50 is an integrated circuit essentially comprising a processing unit, for example a programmable microcontroller, an interface, typically a radio transceiver, for interfacing with an APP on an APP-compatible device 60, and an interface, typically serial, for interfacing with the controller 16. The APP interface module 50 actually embodies a transceiver and a wireless-to-wired and wired-to-wireless converter between the controller 16 and the APP-compatible device 60, which allow the APP 62 on the APP-compatible device 60 to interact with the controller 16 in the ways described hereinafter.

More preferably, the transceiver radio of the APP interface module 50 operates in the frequency band of 2.4 GHz.

Preferably, the communication takes place through a low power protocol.

Even more preferably, the module 50 uses a Bluetooth Low Energy or ANT+ communication protocol.

Even more preferably, the APP interface module comprises an antenna integrated in the printed circuit. Such an integrated antenna can for example be in the form of a coated copper track.

Preferably, the APP interface module 50 is "stand alone", in the sense that it only needs to be powered with an adequate voltage and with the appropriate signals, but it is provided with its own hardware for regulating the internal voltages.

The APP interface module 50 can alternatively be an integral part of the controller 16 and/or use the same wired-to-wireless and/or wireless-to-wired transducer 42 intended for the other transducing functions within the bicycle electronic system 1. In this case, the APP interface module 50 comprises a software module, such as a communication library, integrated within the controller 16 of the bicycle electronic system, and an interface for interfacing with the aforementioned APP.

As an alternative to the transceiver radio interface, the interaction between the APP 62 on the APP-compatible device 60 and the APP interface module 50 and/or between the APP 62 on the APP-compatible device 60 and the controller 16 of the bicycle electronic system 1 could take place by providing for a wireless connection of the WIFI or IR type or a wired connection.

Moreover, the interaction between the APP interface module 50 and the controller 16 of the bicycle electronic system 1 could also take place by providing for a wireless interface between the two.

Preferably, at the first access to the APP 62 the pairing between the devices is carried out, namely an association is created between the APP-compatible device 60 on which the APP 62 is available and the APP interface module 50 of the bicycle electronic system 1, with the exchange between the two of an identification code in order to authorize the exchange of data between the devices 50, 60 themselves.

Preferably, at the first access to the APP 62, it signals to the user that it is necessary to "wake up" the on-board electronic system 1, for example by activating the levers/buttons of the electromechanical manual control devices 24, 26, 28 according to a particular combination.

At subsequent accesses to the APP 62, the automatic verification of the identification code between the APP-compatible device 60 on which the APP 62 is available and the APP interface module 50 of the bicycle electronic system 1 takes place, in a manner that is transparent to the user.

The APP 62 available on the APP-compatible device 60 can be a native APP, but preferably it is a web APP, in communication with a server 64, preferably through the Internet 66. In particular, the APP 62 is an application running within an Internet browser on the APP-compatible device 60.

In the case of a web APP, preferably access credentials are provided, that regulate the access of the APP 62 to the server 64. The access credentials typically comprise a username and a password, which can be requested to the user each time or stored—or at least the username—in the APP-compatible device 60.

Also in the case of a substantially native APP, namely installed and executed locally, according to the invention advantageously access to the server 64 is required—through the Internet 66—at least for the authentication of the user and authorization to execute the APP 62 itself. This allows safety to be increased because, blocking the execution of the APP 62 in the absence of the correct credentials, it is possible to avoid, for example, a person using his/her own smartphone to modify the configuration of the bicycle electronic system 1 of another person by mistake or in bad faith.

Through the access credentials, it is also possible to provide the user with a series of services, in particular an anti-theft/shoplifting service and/or a remote control/management service, as better described hereinafter.

As shown in FIG. 2, the bicycle electronic system 1 and the aforementioned APP-compatible device 60 provided with the APP 62 form part of a user assembly 68 according to the invention.

One or more user assemblies 68 and the server 64 form part of an information system 70 for managing bicycles according to the invention.

Preferably, as schematically indicated in FIG. 2, the APP-compatible device 60 of the user assembly 68 and in particular its APP 62 are capable of communicating with the bicycle electronic system 1 of plural bicycles.

Even more preferably, the APP-compatible device 60 and in particular its APP 62 are also capable of managing information relating to one or more bicycles, schematically indicated with 2 . . . , which are not provided with a bicycle electronic system 1 according to the invention, and/or which are not provided with a bicycle electronic system at all.

Such a "bicycle fleet", some provided with bicycle electronic system 1 according to the invention and others (reference numeral 2) not, can represent the vehicles of a single private cyclist, or the vehicles of customers of a mechanic, a bicycle fitter or another commercial operator, as exemplified by the user assembly 68 depicted at the centre in FIG. 2.

The user assembly 68 therefore in such cases comprises an APP-compatible device 60 and two or more bicycle electronic systems 1.

The server 64 is preferably managed by a manufacturer of the bicycle electronic system 1.

FIG. 2 also shows an electronic device 71 distinct from the APP-compatible device 60 of the various user assemblies 68, which can optionally form part of the information system 70 for managing bicycles. According to a per se innovative aspect, irrespective of the particular bicycle management APP 62 described herein, such an electronic device 71, where present, is configured to interact with the bicycle management APP 62 through the server 64, in the manner described hereinafter.

Before describing the bicycle management APP 62 according to the present invention, a specific embodiment of a bicycle electronic system 1 and a user assembly 68 is illustrated and described merely as an example.

Figure 3:
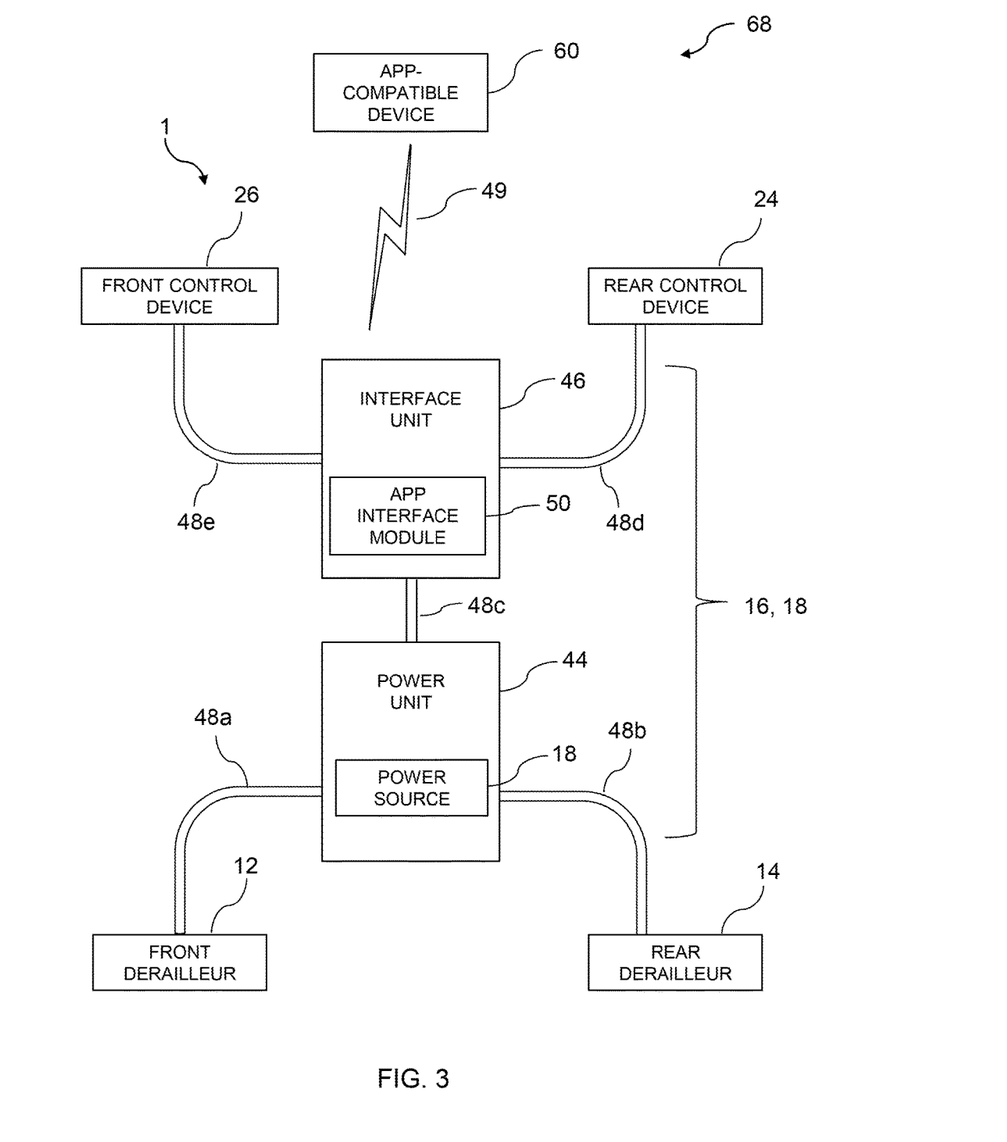
FIG. 3 is a block diagram of an embodiment of a bicycle electronic system and a user assembly according to the present invention.

FIG. 3 is a block diagram of the electric and electronic part of such an embodiment, wherein the bicycle electronic system 1 comprises the rear derailleur 12, the front derailleur 14, a power board or unit 44, an electronic board hereinafter called interface unit or board 46, the rear or right electromechanical manual control device 24, and the front or left electromechanical manual control device 26.

The electronic power board or unit 44, provided with a battery, through wired connections 48a, 48b, 48c, provides the power supply to the derailleurs 12, 14 and to the interface unit or board 46, thus embodying the power source 18 and part of the controller 16 of the bicycle electronic system 1. The same wired connections 48a, 48b, 48c preferably also allow the exchange of data and instructions. The power unit 44 is housed for example in one of the tubes of the handlebars or in one of the tubes of the frame, for example at for a bottle holder.

The interface unit 46, through wired connections 48d, 48e, receives the manual commands input by the electromechanical manual control devices 24, 26 and possibly processes them forming a part of the controller 16. The same wired connections 48d, 48e can also allow the exchange of data and instructions if the electromechanical manual control devices 24, 26 are in turn provided with a device that forms part of the controller 16.

The interface unit 46 forwards the commands input by the user to the power unit 44 through the wired connection 48c.

The interface unit 46 is housed for example in one of the tubes of the handlebars or in a grippable device forming one of the two electromechanical manual control devices 24, 26.

In the embodiment of FIG. 3, the APP interface module 50 is integrated within the interface unit 46. The connection 49 between the APP interface module 50 and the APP-compatible device 60 is of the wireless type.

Figure 4:
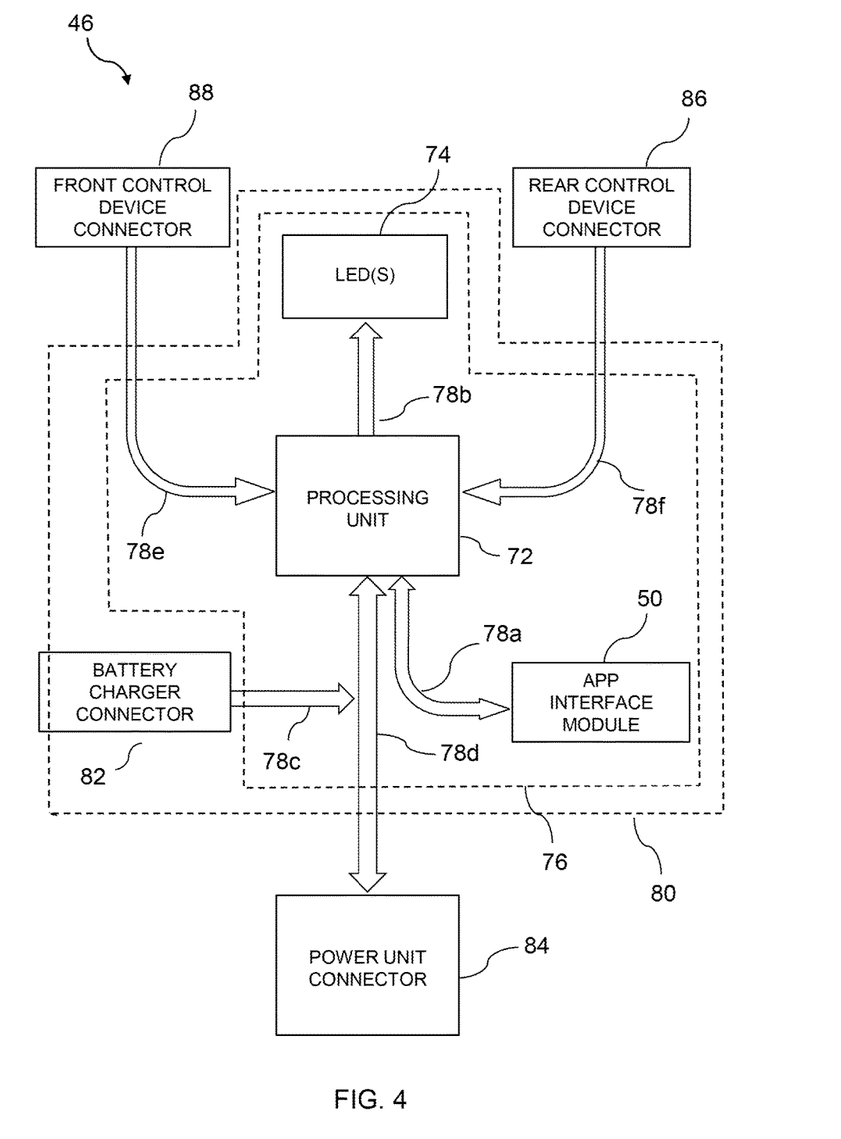
FIG. 4 is a block diagram of an embodiment of an interface unit of FIG. 3.

FIG. 4 is a block diagram illustrating in greater detail an embodiment of the interface unit 46 of FIG. 3, also provided merely as an example.

The interface unit 46 comprises a processing unit, typically a microprocessor 72—forming part of the controller 16—, one or more visual indicators such as one or more LED(s) 74, and the APP interface module 50, integrated on a circuit board 76. A first connection 78a is made between the processing unit 72 and the APP interface module 50, and a second connection 78b is made between the processing unit 72 and the visual indicators 74.

The circuit board 76 is enclosed in a casing 80, preferably air-tight. At the casing 80 a first connector 82 is made for the battery charger 20, which is in communication, through a third connection 78c, with a fourth connection 78d between the processing unit 72 and a second connector 84 for the power unit 44. The second connector 84 is preferably made at the end of a cable exiting the casing 80, and preferably of adequate length to reach, inside or along the frame of the bicycle, the location of the power unit 44.

There are also a fifth and a sixth connection 78e, 78f between the processing unit 72 and, respectively, a third and fourth connector 86, 88 for the electromechanical manual control devices 26, 24, the connectors 86, 88 preferably being made at the end of cables exiting the casing 80, and preferably of adequate length to reach, inside or along the frame of the bicycle, the location of the electromechanical manual control devices 24, 26.

The bicycle management APP 62 according to the invention allows one or more of the following possibilities:

a) updating a firmware stored and executed by the controller 16, more specifically:

a1) updating a firmware stored and executed by the processing unit 72 of the interface unit 46, and/or a2) updating a firmware stored and executed by a processing unit (not shown) of the power unit 44, and/or a3) updating a firmware stored and executed by a processing unit of the APP interface module 50; and/or b) setting a value for one or more parameters of the firmware stored and executed by the controller 16, more specifically b1) setting a value for one or more parameters of a firmware stored and executed by the processing unit 72 of the interface unit 46, and/or b2) setting a value for one or more parameters of a firmware stored and executed by a processing unit (not shown) of the power unit 44, and/or b3) setting a value for one or more parameters of a firmware stored and executed by a processing unit of the APP interface module 50.

In the case of an APP interface module 50 integrated within the controller 16, the processing unit of the APP interface module 50 is part of the controller 16.

If the structure of the bicycle electronic system 1 provides for a shared controller 16 for the management of the manual control devices 24, 26, 28 and for the management of the derailleurs 12, 14, the APP 62 can allow updating of the version of the firmware stored and executed by such a shared controller 16.

Preferably, the bicycle management APP 62 according to the invention also allows one or more of the following possibilities:

c) storing the physical configuration of the bicycle electronic system 1, d) displaying to the user indications on the state of the bicycle electronic system 1;

e) diagnostics of the components of the bicycle electronic system 1;

f) communicating to/from the server 64 the outcome of diagnostic procedures/the diagnosis;

g) storing and/or displaying and/or communicating to the server 64 travel data; h) inputting a command to change a gear ratio of the bicycle electronic system 1;

i) suggesting a user to change a gear ratio of the bicycle electronic system 1;

j) an anti-theft/shoplifting function, and/or any combination of functionalities a)-i).

Preferably the APP 62 is also configured to carry out the storage of a physical configuration of at least one bicycle 2 without bicycle electronic system.

Preferably, some of the aforementioned capabilities are only offered when a user with commercial operator credentials, such as a mechanic, accesses the APP 62 (for example diagnostics and updating the firmware); others, on the other hand, are only offered when a user with personal credentials accesses the APP 62 (for example storing and displaying the travel parameters, itineraries, and the like); still others are offered when a user with either commercial operator or personal credentials accesses the APP 62.

In general, the updating of the firmware (cf. letter a) can comprise for example the addition to the firmware of further possibilities, the modification of algorithms at the basis of the firmware, the correction of programming bugs, etc.

In the various aforementioned cases, the updated version of the firmware is preferably downloaded from the server 64. More specifically, the APP 62 is preferably capable of transmitting to the server 64 information relating to the components of the bicycle electronic system 1 and information relating to the versions of the installed firmware or of the various installed firmware, and the server 64 is able to signal to the APP 62, which in turn will signal to the user, the presence of more up-to-date versions of the firmware(s). Upon request by the APP 62, possibly upon request by the user (preferably, with commercial operator credentials), the APP 62 is able to carry out the download from the server 64 of the new version of firmware, and download it into the controller 16 of the bicycle electronic system 1 and/or into the APP interface module 50.

The use of access credentials advantageously allows the server 64 of the manufacturer of the bicycle electronic system 1 to transmit the appropriate firmware for the configuration of the bicycle electronic system 1 actually mounted on the bicycle and/or only if the bicycle electronic system 1 or its components has/have been duly purchased.

Preferably, the download procedure provides for signalling to the user, on the APP-compatible device 60, the fact that it is necessary for both the battery power source 18 of the bicycle electronic system 1 and the battery of the APP-compatible device 60 to be sufficiently charged; thereafter—once the confirmation has been received from the user (preferably, with commercial operator credentials)—it provides for signalling to the user, on the APP-compatible device 60, the fact that the download and installation of the new firmware version are in progress; and finally possibly—in the case of updating of the firmware of the power unit 44—it can provide for signalling to the user the fact that it is necessary to carry out other operations, for example resetting the value of some parameters.

Concerning the parameters of the firmware stored and executed by the processing unit or microprocessor 72 of the interface unit 46 (letter b1), it should be observed that the interface unit 46 manages the manual commands input through the devices 24, 26, 28 through a firmware that has a series of parameters. Indeed, the firmware may for example have to distinguish which button/lever has been actuated among the several ones that may be present on the manual control device, and with what intent; it may for example have to distinguish a deliberate actuation from an accidental actuation due for example to uneven terrain; it may for example have to distinguish an actuation in order to input a single gearshifting command from an actuation in order to input a multiple gearshifting command. These functionalities are managed through a series of instructions stored in the firmware, and through a series of parameters, the value of which can be modified by the user based on his/her own requirements and/or preferences, including, only as an example: the functionality of a "MODE" button on the right control device and of a "MODE" button on the left control device; the minimum activation time of a switch in order to qualify the actuation as deliberate; the minimum activation time of a switch in order to qualify the actuation as a multiple gearshifting request.

Concerning the configuration of the commands, an electromechanical manual control device of the type of the rear control device 24—or of the front control device 26, respectively—typically has at least two levers/buttons, one to input a command for displacing the rear derailleur 12—or the front derailleur 14, respectively—towards a toothed wheel having a larger diameter, and one for inputting a command for displacing the rear derailleur 12—or the front derailleur 14, respectively—towards a toothed wheel of smaller diameter. With the help of a parameter, the function of such two levers/buttons can be switched so that one is used to increase the gear ratio, and therefore increase the effort by the cyclist (herein called "hard" command), and one is used to reduce the gear ratio and therefore decrease the effort by the cyclist (herein called "soft" command), so as to simulate an electromechanical manual control device of the type of the control device 28.

Concerning the parameters of the firmware stored and executed by the processing unit or microprocessor of the power unit 44 (letter b2), the power unit 44 executes, to manage the derailleurs 12, 14, a firmware that can have even a very high number of variables and parameters. Only as an example, the firmware of the power unit 44 can provide for:

parametric operation based on the number of toothed wheels (sprockets and crowns) present in the rear gearshift group and in the front gearshift group;

more or less fast gearshifting times to make gearshifting "softer" or, vice-versa, "harder": for example, an operating parameter may be provided for, the value of which can be selected among "soft", "normal" and "race" values, wherein for example the value can be independently selected for the rear derailleur 12 and for the front derailleur 14 or not, and/or independently for upward and downward gearshifting or not;

that multiple gearshifting is or is not possible, and possibly the maximum number of toothed wheels to be changed at once and/or the maximum actuation time of the derailleur 12, 14, possibly providing for independent setting of such a number/of such a maximum time for upward gearshifting and for downward gearshifting;

that in the actuation of all gearshifting or some gearshifting, an "extra-stroke" be carried out, namely the displacement of the derailleur beyond the toothed wheel on which the motion transmission chain must be taken into engagement, wherein one or more parameters may be, for example, the amount of extra-stroke, common to all of the toothed wheels or not;

repositioning following the extra-stroke and/or following the detection of an accidental displacement of the derailleur 12, 14;

a maximum number of unsuccessful attempts to actuate the motor of a derailleur 12, 14;

rough and/or fine setting of the exact positions of the toothed wheels of the specific front/rear gearshift group mounted on the bicycle instead of being based on default values; and so on.

Concerning the parameters of the firmware stored and executed by the processing unit of the APP interface module 50 (letter b3), these can comprise for example the number and the identifiers of the connected devices, the pairing codes, whether or not access credentials are necessary, etc.

Preferably, the bicycle management APP 62 is configured to present the user with a guided procedure for interaction with the bicycle electronic system 1, aimed at obtaining the value of said one or more parameters. In this way, the specific value of the parameter can also remain totally transparent to the user.

Only as an example, the guided procedure can ask the user to move the gearshift 10 in a certain way, to observe the position of the cage of the derailleur 12, 14 with respect to a certain toothed wheel, and to press a button of the electromechanical device 24, 26 when he/she considers that an alignment condition has been reached, in order to obtain—in a manner transparent to the user—the value of a parameter indicative of an offset in the mutual position between cage and toothed wheel in the real gearshift from a pre-stored default position for the model of gearshift mounted on the bicycle.

As far as the physical configuration of the bicycle electronic system 1 is concerned (letter c), it is open to several variants. For example, the rear gearshift group and the front gearshift group can have a variable number of toothed wheels (sprockets and crowns) and each of them can have a variable number of teeth. Example parameters relating to the physical configuration of the bicycle electronic system 1—which are stored through the APP 62—are therefore:

the combination of the minimum and maximum number of teeth of the toothed wheels of the rear gearshift group, for example selectable among 11-23, 11-25, 11-27;

the combination of the minimum and maximum number of teeth of the toothed wheels of the front gearshift group, for example selectable among 53-39, 52-36 or 50-34; etc.

As an example of the potentialities of displaying to the user indications on the state of the bicycle electronic system 1 (letter d), the APP 62 can be configured or programmed to supply one or more of the following visual indications:

the residual charge of the power source 18, the current position of the rear derailleur 12 and/or of the front derailleur 14, for example in terms of number of toothed wheel currently engaged by the chain, in terms of graphical representation thereof, in terms of number of teeth thereof;

the current gear ratio;

the serial number and/or the hardware version and/or firmware version of the controller 16, in particular of the power board 44 and/or of the interface unit 46 and/or of the APP interface module 50, and possibly the availability of more recent firmware versions for download, for example through a display of the current version in a colour conventionally associated with a warning, such as yellow or red, a visual indication to the user when a lever or a button of a control device 24, 26, 28 is activated, for example through illumination of a corresponding icon;

historical data, like for example the total number (from the first switching on of the bicycle electronic system 1) and partial number (from the least time it was switched on and/or from the last zeroing) of gearshifting operations carried out by the rear derailleur 12 and/or by the front derailleur 14.

Relative to the diagnostics (letter e), the APP 62 can provide for automatic displaying of errors and/or one or more test and diagnostic procedures, for example:

indication to the user of the fact that the power source 18 of the bicycle electronic system 1 could have run out, in case the APP 62 is unable to communicate with the APP interface module 50;

displaying to the user (preferably, with commercial operator credentials) the malfunction of a manual control 24, 26, 28 when the interface unit 46 detects that an electric circuit that should normally be open and only be closed upon activation of a command by a user is actually always closed (or vice-versa), due to a button/lever that is mechanically stuck, the presence of water in the connector 86, 88, a short circuit in the wiring 78e, 78f etc.; preferably the display includes the indication of the particular button/lever on which the failure is detected;

displaying to the user (preferably, with commercial operator credentials) a malfunction identified by the interface unit 46, when for example it does not communicate with the power unit 44, displaying to the user (preferably, with commercial operator credentials) a malfunction identified by the power unit 44, for example when it detects the absence or the malfunction of the connection 48a, 48b with the derailleurs 12, 14;

displaying to the user (preferably, with commercial operator credentials) the malfunction of the rear derailleur 12 and/or of the front derailleur 14, when the power unit 44 detects for example a malfunction of a position sensor and/or a positioning out of range of the derailleur and/or a malfunction of a motor of the derailleur (for example a power drop in the supply of the motor, an anomalous power absorption, a short-circuit in the power supply coil of the motor) and/or is unable to correctly identify a component of the derailleur;

a test procedure of the interface unit 46 and in particular of the respective LED display 74, for example providing to switch on, in sequence, an LED 74 in a plurality of colours, such as white, red, green, yellow, blue, pink for a short time period each, simultaneously with the indication on the APP-compatible device 60 of what colour should be emitted at each moment: the user (preferably, with commercial operator credentials) checks by sight whether the LED 74 emits the corresponding colour, and in the case of an anomaly acknowledges this and possibly takes care of maintenance/replacement, and/or the microprocessor 72 of the interface unit 46 checks whether there are malfunctions and signals them to the server 64;

a testing procedure of the power unit 44 and of the derailleurs 12, 14, for example providing for a complete excursion of the motion transmission chain onto all the pairs of toothed wheels, at the same time as the indication on the APP-compatible device 60 of which toothed wheel should be engaged at each moment: the user (preferably, with commercial operator credentials) checks by sight whether the positioning takes place correctly, and in the case of an anomaly acknowledges this and possibly takes care of maintenance/replacement, and/or the microprocessor of the power unit 44 checks whether there are malfunctions and signals them to the server 64; preferably the procedure provides to indicate to the user to bring the chain in engagement with the largest toothed wheel or sprocket of the rear gearshift group and with the smallest toothed wheel or sprocket of the front gearshift group; then to require the user to rotate the pedal cranks continuously; and to make subsequent gearshiftings, first of the rear derailleur, at predetermined time intervals, until it is brought into engagement with the smallest toothed wheel or sprocket of the rear gearshift group, then to carry out a gearshifting of the front derailleur, until it is brought into engagement with the largest toothed wheel or sprocket of the front gearshift group; then once again to make subsequent gearshiftings of the rear derailleur, at predetermined time intervals, until it is brought into engagement with the largest toothed wheel or sprocket of the rear gearshift group (in the case of a front gearshift group having more than two toothed wheels, there will be a greater number of excursions so as to test all of the pairs of toothed wheels).

In order to facilitate the diagnostics of the power unit 44, the APP 62 can provide for the possibility of setting the bicycle electronic system 1 in such a way that it can be controlled with the right hand only or with the left hand only, for example providing that a lever or levers of the electromechanical manual control device 24, 26 control(s) the upward and downward actuation of the derailleur commonly associated with the device itself (rear derailleur in the case of the right control device; front derailleur in the case of the left control device), but that a respective "MODE" button switches the operation thereof to make it operative on the other derailleur (front derailleur in the case of the right control device, and rear derailleur in the case of the left control device).

As indicated at letter f), the APP 62 can also provide for the communication to the server 64 of the outcome of the diagnostic tests; the server 64 or an operator thereof can use such an outcome to formulate a diagnosis; the diagnosis can for example be communicated by the server 64 to the APP 62 for displaying to the user. In this way it is for example possible to indicate to the user that it is appropriate to carry out some maintenance and/or replacements of components of the bicycle electronic system 1.

Relative to the storage and displaying and/or communication to the server 64 of travel data (letter g), the APP 62 can for example communicate with a geo-location module of the APP-compatible device 60 and/or with maps and/or with the various sensors of the bicycle electronic system 1 so as to keep track of the kilometers traveled, of the slopes covered, of the minimum, maximum and average speeds, of the gear ratios engaged at each moment and so on, possibly in an integrated manner with data on the position and/or special features of the travel terrain and/or relative to the cyclist.

Alternatively or in addition, it may be the server 64 that integrates travel data relative to the bicycle electronic system 1 with at least one software application distinct from the aforementioned APP 62.

In this case, for example, the travel data such as the power, the engaged gear ratio, the heart rate of the cyclist, etc. are collected, for example at predetermined time intervals, by the various sensors 32 of the bicycle electronic system 1, and are stored by the APP 62 and transmitted to the server 64. The software application into which the server 64 integrates the travel data can comprise, for example, a geo-location, anti-theft/shoplifting, mapping, fitness monitoring, social network data sharing application, etc.

In this way it is possible to display to the user or to others an extremely complete travel report.

Moreover, it is possible to implement an anti-theft/shoplifting service (letter j) that is particularly effective in the information system 70 combining the access to the server 64 by the APP 62 through access credentials with geo-location of the bicycle electronic system 1 carried out through the APP 62. For example, the user authenticated through the access credentials and who has registered the specific bicycle electronic system 1, for example through a serial number thereof, can indicate at the server 64 a permitted geographical area, possibly in association with a time interval such as the duration of a race or a tour, and the server 64 can monitor the exit of the bicycle electronic system 1 from such an area, warning the user and/or taking other suitable measures in the case of exit.

It is also possible to provide for an electromechanical lock of the bicycle, released only in the presence of the APP-compatible device 60 associated with the bicycle electronic system 1 and/or of the access credentials to the server 64.

Relative to the inputting of a command to change gear ratio of the bicycle electronic system 1 (letter h), the bicycle management APP 62 can provide an input interface, for example a keypad or graphical interface or a touch screen or a voice command interface.

Advantageously it is possible to indicate a toothed wheel to be directly reached with the rear derailleur 12 or with the front derailleur 14, respectively, to carry out a single or multiple gearshifting. In this way, there is no need to impart multiple commands in a rapid sequence with a lever/button of the control device 24, 26, 28 and/or a command of a duration proportional to the number of toothed wheels by which one wishes to move.

Alternatively, with such an interface it can be indicated to increase or reduce the gear ratio ("hard"/"soft" gearshifting described above).

The bicycle management APP 62 can also—alternatively or in addition—provide an output interface to the user, in particular relative to the issue of a suggestion (letter i) to change the gear ratio of the bicycle electronic system 1. In this way, a semiautomatic mode is obtained that is still different from the one described above, wherein the controller 16 evaluates the current conditions and establishes when it would be appropriate to send a control signal to the gearshift 10; however, instead of sending it directly, it is limited to advising the cyclist to do so. The suggestion can take place through sound or visual signalling.

The information system 70 and the bicycle management APP 62 described above also make it possible to implement a remote control of the bicycle electronic system 1.

In particular, according to the invention it is provided for the bicycle management APP 62 to obtain the value of said one or more parameters and/or the current value of one or more variables from the server 64, a software code external to said APP being provided for, configured to set the value of said one or more parameters and/or of said one or more variables on the server 64.

Thus, a team manager, a coach, a technician of the manufacturer of the bicycle electronic system 1 or others can change, on the server 64, the desired value for one or more of the parameters discussed above, for example following the evaluation of a terrain intended by the cyclist and/or the current travel conditions such as the conditions of the bicycle electronic system 1 and/or the physical conditions of the cyclist, for example evaluated based on the output of the heart rate monitor 34.

Such a third person can directly access the server 64, but preferably accesses it in turn through his/her own electronic device 71, typically exploiting an Internet connection. In this way, it is possible to configure the bicycle electronic system 1 even in real time from an automobile or other vehicle that follows the cyclist, with very low risk of loss of communication.

Preferably, the input in the system 1 of a gearshifting command (whether it is single, multiple, of the gear ratio, or relative to a specific derailleur 12, 14) and/or the issue of a suggestion to the cyclist to change gear ratio can also be managed by such a third person, through the server 64 and advantageously the electronic device 71. When the team manager, coach or other considers that it is appropriate or necessary to change, by evaluating the travel conditions by sight and/or through the travel data that the APP 62 sends to the server 64, he/she can either have the suggestion reach the cyclist, or carry out gearshifting directly.

The above is a description of various embodiments of inventive aspects, and further changes can be made without departing from the scope of the present invention. The shape and/or size and/or location and/or orientation of the various components and/or the sequence of the various steps can be changed. The functions of one element or module can be carried out by two or more components or modules, and vice-versa. Components shown directly connected or contacting each other may have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, independently of what is explicitly described as innovative.

What is claimed is:

1. An apparatus for modifying the operation of an on-board controller in an electronic system on a bicycle, the apparatus comprising:
    an APP-compatible external device that contains software code in a bicycle management APP and is configured to wirelessly communicate with an APP interface module of the on-board controller,
    the software code performs at least one of:
    a) modifying firmware stored in the on-board controller, or
    b) setting a value for at least one parameter stored in the firmware in the on-board controller.

2. A bicycle user assembly comprising:
    a bicycle electronic system including an on-board controller and an on-board APP interface module;
    a bicycle management APP including software code and configured to be installed on an APP-compatible external device for modifying the operation of the on-board controller,
    the on-board APP interface module is configured to interface with the software code through a wireless communication, and
    the software code performs at least one of:
    a) modifying firmware stored in the on-board controller, or
    b) setting a value for at least one parameter stored in the firmware in the on-board controller.

3. A bicycle user assembly comprising:
    a bicycle electronic system including an on-board controller and an on-board APP interface module;
    a bicycle management APP including software code and configured to be installed on an APP-compatible external device for modifying the operation of the on-board controller,
    the on-board APP interface module is configured to interface with the software code through a matching communication interface on the APP-compatible external device, and
    the software code performs at least one of:
    a) modifying firmware stored in the on-board controller, or
    b) setting a value for at least one parameter stored in the firmware in the on-board controller.

4. The bicycle user assembly according to claim 3, wherein said software code configured to perform step a) is configured to perform at least one of:
    a1) updating an interface unit firmware stored and executed by a processing unit of an interface unit of the bicycle electronic system, said interface unit being configured to receive manual commands input by electromechanical manual control devices,
    a2) updating a power unit firmware stored and executed by a processing unit of a power unit of the bicycle electronic system, said power unit being configured to manage at least one derailleur of the bicycle electronic system, or
    a3) updating an APP interface module firmware stored and executed by a processing unit of the APP interface module.

5. The bicycle user assembly according to claim 3, wherein said software code configured to perform step b) is configured to perform at least one of:
    b1) setting a value for one or more parameters of an interface unit firmware stored and executed by a processing unit of an interface unit of the bicycle electronic system, said interface unit being configured to receive manual commands input by electromechanical manual control devices,
    b2) setting a value for one or more parameters of a power unit firmware stored and executed by a processing unit of a power unit of the bicycle electronic system, said power unit being configured to manage at least one derailleur of the bicycle electronic system, or
    b3) setting a value for one or more parameters of an APP interface module firmware stored and executed by a processing unit of the APP interface module.

6. The bicycle user assembly according to claim 3, wherein said software code is configured to present a user with a guided procedure for interaction with the bicycle electronic system aimed at obtaining the value of said one or more parameters.

7. The bicycle user assembly according to claim 3, wherein said software code is configured to obtain the value of at least one of said one or more parameters or a current value of one or more variables from a remote server,
    an additional software code external to said APP being provided for, configured to set the value of at least one of said one or more parameters or of said one or more variables on the remote server.

8. The bicycle user assembly according to claim 3, further comprising software code configured to perform at least one of:
    c) storing a physical configuration of the bicycle electronic system;

d) displaying indications on a state of the bicycle electronic system to a user;
e) diagnostics of components of the bicycle electronic system;
f) communicating to/from a server an outcome of diagnostic procedures/a diagnosis;
g) at least one of storing, displaying, or communicating to a server travel data;
h) inputting a command to change a gear ratio of the bicycle electronic system;
i) suggesting a user to change the gear ratio of the bicycle electronic system; or
j) anti-theft/shoplifting function.

9. The bicycle user assembly of claim 3, wherein the on-board APP interface module comprises a programmable processing unit, an interface for interfacing with the bicycle management APP, and an interface for interfacing with the on-board controller of the bicycle electronic system.

10. The bicycle user assembly of claim 9, wherein said interface for interfacing with the APP is a transceiver radio.

11. The bicycle electronic user assembly of claim 3, wherein the on-board APP interface module comprises a software module integrated within the on-board controller of the bicycle electronic system, and an interface for interfacing with the bicycle management APP.

12. An information system for managing bicycles comprising at least one bicycle user assembly according to claim 3 and a server, the APP-compatible external device being configured to communicate with the server over a telecommunication network.

13. The information system of claim 12, wherein the server is configured to receive access credentials and/or information on the bicycle electronic system from the bicycle management APP, and to allow the APP to be executed and/or at least one firmware for storage in, and execution by, the on-board controller of the bicycle electronic system and/or said APP interface module to be downloaded through the APP based on the access credentials and/or information on the bicycle electronic system received.

14. The information system of claim 12, wherein the server is configured to integrate travel data relative to the bicycle electronic system with at least one software application distinct from the bicycle management APP.

15. The information system of claim 12, further comprising an electronic device distinct from the APP-compatible external device of said bicycle user assembly and configured to interact with said bicycle management APP through said server.

* * * * *